(12) United States Patent
Kim et al.

(10) Patent No.: US 11,392,706 B2
(45) Date of Patent: Jul. 19, 2022

(54) HARDWARE MODULE AND ITS CONTROL METHOD WITH A 32-BIT INSTRUCTION EXTENSION FOR PROCESSOR SUPPORTING ARIA ENCRYPTION AND DECRYPTION

(71) Applicant: Pusan National University Industry—University Cooperation Foundation, Busan (KR)

(72) Inventors: Howon Kim, Busan (KR); Haeyoung Kim, Ulsan (KR); Jinjae Lee, Busan (KR)

(73) Assignee: PUSAN NATIONAL UNIVERSITY INDUSTRY—UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 17/510,884

(22) Filed: Oct. 26, 2021

(65) Prior Publication Data
US 2022/0164454 A1 May 26, 2022

(30) Foreign Application Priority Data
Nov. 23, 2020 (KR) .................. 10-2020-0158243

(51) Int. Cl.
*G06F 21/60* (2013.01)
*G06F 17/16* (2006.01)
(Continued)

(52) U.S. Cl.
CPC .......... *G06F 21/602* (2013.01); *G06F 9/3802* (2013.01); *G06F 17/16* (2013.01); *G06F 21/54* (2013.01)

(58) Field of Classification Search
None
See application file for complete search history.

(56) References Cited

U.S. PATENT DOCUMENTS 9,996,708 B2 * 6/2018 Satpathy ............... G06F 21/74
2004/0071289 A1 * 4/2004 Rose ................. H04L 9/0668
380/37
(Continued)

FOREIGN PATENT DOCUMENTS

CN 103490877 A * 1/2014
JP 4216445 B2 * 1/2009
(Continued)

*Primary Examiner* — John M Lindlof
(74) *Attorney, Agent, or Firm* — Paratus Law Group, PLLC (57) ABSTRACT

Disclosed is a hardware module with a 32-bit unit operation for processor supporting ARIA encryption and decryption, including: an instruction pipeline that executes an instruction fetch, instruction decoding, and an instruction execution; and an ARIA operation module that has a 32-bit unit operation system provided in the instruction execution pipeline to support ARIA encryption and decryption. Two types of instructions, ARIA substitution layer and diffusion layer instructions are provided as a 32-bit unit operation instruction in order to provide an ARIA encryption/decryption function through the ARIA operation module, the substitution layer instruction includes two instructions for an even round and an odd round of the ARIA encryption/decryption, and the diffusion layer includes four types of diffusion layer instructions for the even sub-round and four types of diffusion layer instructions for the odd sub-round.

10 Claims, 7 Drawing Sheets

(51) Int. Cl.
*G06F 9/38* (2018.01)
*G06F 21/54* (2013.01)

(56) References Cited

U.S. PATENT DOCUMENTS

2015/0067302 A1* 3/2015 Gueron ............... G06F 9/30149
  712/210
2016/0034257 A1* 2/2016 Stark ........................ G09C 1/00
  708/625
2019/0238330 A1* 8/2019 Gulley .................... G06F 21/72
2019/0245679 A1* 8/2019 Suresh ..................... G09C 1/00

FOREIGN PATENT DOCUMENTS

| KR | 10-0786391 B1 | 12/2007 | | |
|---|---|---|---|---|
| KR | 10-2009-0021972 A | 3/2009 | | |
| KR | 10-2010-0068902 A | 6/2010 | | |
| KR | 20100068902 A * | 6/2010 | | |
| WO | WO-2013112118 A2 * | 8/2013 | ........... | H04L 9/3239 |

* cited by examiner

HARDWARE MODULE AND ITS CONTROL METHOD WITH A 32-BIT INSTRUCTION EXTENSION FOR PROCESSOR SUPPORTING ARIA ENCRYPTION AND DECRYPTION

CROSS-REFERENCE TO RELATED APPLICATION

This application claims priority to Korean Patent Application No. 10-2020-0158243 (filed on Nov. 23, 2020), which is hereby incorporated by reference in its entirety.

BACKGROUND

The present disclosure relates to ARIA block cipher operation, and more particularly, to a hardware module and its control method with a 32-bit instruction extension for processor capable of improving performance of encryption and decryption operations of block cipher ARIA on a 32-bit microprocessor.

An ARIA crypto algorithm is a block symmetric key crypto algorithm developed by the National Security Research Institute of South Korea.

As social and economic activities based on the Internet increase, the demand for safety and reliability of electronic transactions and protection of user privacy is rapidly increasing.

In particular, the need for data communication between government agencies and a private sector (government to citizen (G2C)) has increased due to the implementation of e-Government or the like, and ARIA, a block symmetric key crypto algorithm, has been announced for the purpose of information protection.

An ARIA encryption/decryption algorithm is an algorithm in which encryption and decryption processes have the same structure, and performs an encryption/decryption operation by a round operation, and each round operation includes a substitution operation and a diffusion operation.

On the other hand, the use of IoT products with weak security is increasing due to the proliferation of IoT devices. The IoT devices mainly use low-performance processors and do not respond to crypto algorithms that require high-performance computational ability, and often requires connection with a security module external to the processor to support security.

With the advent of RISC-V ISA, an open source ISA, methods to strengthen the security of the processor at the instruction set level are being studied to solve the security problem of low-performance devices such as IoT devices. However, it is a difficult task to add instructions according to operating requirements of the processor because it requires changing the hardware structure of the crypto algorithm.

Although technical research is being conducted to solve such a problem, most of the related arts have a problem in that they do not deal with the block cipher algorithm, which is the most used in data encryption/decryption.

Intel's AES-NI crypto instruction extensions provides 128-bit unit instructions for block cipher AES.

Like encryption round instruction and round key generation instruction, an operation unit of one instruction is large, and therefore, a size of a crypto module inserted to execute the instruction also increases.

This characteristic means that AES-NI may not be applied to low-performance processors such as lightweight IoT devices, but may be applied only to high-performance processors.

Therefore, the development of a new technology for implementing an efficient hardware structure of a block cipher algorithm ARIA for instruction extensions in a processor capable of adding instruction extensions is required.

RELATED ART DOCUMENT

[Patent Document]
(Patent Document 1) Korean Patent Laid-Open Publication No. 10-2009-0021972
(Patent Document 2) Korean Patent No. 10-0786391
(Patent Document 3) Korean Patent Laid-Open Publication No. 10-2010-0068902

SUMMARY

The present disclosure is to a hardware module and its control method with a 32-bit instruction extension for processor supporting ARIA encryption and decryption capable of improving performance of a block cipher ARIA operation on a 32-bit microprocessor.

Another object of the present invention is to provide a hardware module and its control method with a 32-bit instruction extension for processor supporting ARIA encryption and decryption that enable 128-bit operation, the basic operation unit of block cipher ARIA, to be performed with 32-bit unit operation instructions.

Another object of the present invention is to provide a hardware module and its control method with a 32-bit instruction extension for processor supporting ARIA encryption and decryption that enable full ARIA encryption using added 32-bit substitution layer and diffusion layer instructions and basic instructions of low-performance processors such as lightweight IoT devices.

Another object of the present invention is to provide a hardware module and its control method with a structure suitable for extension for processor supporting ARIA encryption and decryption that have a structure suitable for use in a low-performance processor with a 32-bit system, such as a 32-bit lightweight IoT device.

Another object of the present invention is to provide a hardware module and its control method with a 32-bit instruction extension for processor supporting ARIA encryption and decryption that have a faster speed than an operation using only software and perform the entire encryption and decryption through a combination of software and hardware to reduce an area of an added encryption module.

The objects of the present disclosure are not limited to the above-mentioned effects. That is, other objects that are not mentioned may be obviously understood by those skilled in the art from the claims.

In order to achieve an object, a processor with a 32-bit instruction extension supporting ARIA encryption and decryption includes: an instruction pipeline that executes an instruction fetch, instruction decoding, and an instruction; and an ARIA operation module that has a 32-bit unit operation system provided in the instruction execution pipeline to support ARIA encryption and decryption, in which two types of instructions, ARIA substitution layer and diffusion layer instructions are provided as a 32-bit unit operation instruction in order to provide an ARIA encryption/decryption function through the ARIA operation module, and the substitution layer instruction includes two instructions for an even round and an odd round of the ARIA encryption/decryption, and the diffusion layer includes four types of diffusion layer instructions for the even sub-round and four types of diffusion layer instructions for the odd sub-round.

Two types of substitution layer instructions may be implemented using two types of sbox of the ARIA and an inverse substitution thereof, and two types of instructions may use four sbox modules but different control methods.

Since the two types of instructions are supported as a 32-bit unit operation instruction, the instruction may be used 4 times in one round to perform a 128-bit operation.

Eight types of diffusion layer instructions may use swap method between partial matrices for an ARIA diffusion layer operation, and each sub-round may use a 32-bit unit operation instruction by four to perform a 128-bit operation, and the hardware module may have a structure in which result value of an ARIA diffusion layer calculation is output after the sub-round is performed four times in a way that a current calculation result value is accumulated on a result value of a previous sub-round.

In order to achieve another object, in a control method of hardware module with a 32-bit instruction extension for processor supporting ARIA encryption and decryption, for ARIA substitution layer and diffusion layer instruction operations for a 32-bit unit operation, a round function execution for ARIA encryption/decryption operation includes: a substitution layer execution step of performing a substitution layer operation for odd/even rounds of ARIA; and a diffusion layer execution step of performing an odd sub-round diffusion layer operation for a single round of ARIA and an even sub-round diffusion layer operation for a single round of ARIA.

The extended instruction set for operating the block cipher ARIA operating in the instruction execution step during the instruction pipeline process of the processor may be composed of a 32-bit substitution layer instruction and a 32-bit diffusion layer instruction.

The substitution layer instruction may be composed of two sub-instructions for an odd round and an even round, and the diffusion layer instruction is composed of eight sub-instructions for the odd sub-round and the even sub-round.

In a case of the substitution layer instruction, four types of SBOX operation modules used for the substitution layer operation may be implemented, and a 32-bit unit operation instruction may be implemented with multiplexing to support different types of substitution layer operations used in the odd round and the even round.

To support the substitution layer instruction, the implementation of SBOX is composed of four SBOXs, including two SBOXs S1 and S2 and an inverse thereof, when used in two substitution layer instructions, may operate in such a way that an input and an output of the module are changed via internal control signals.

Since a diffusion layer instruction has one instruction for each 4*4 matrix operation in the odd sub-round, a total of four instructions may be used, and since the diffusion layer instruction has one instruction for each 4*4 matrix operation in the even sub-round, a total of four instructions may be used.

For one round operation, an odd sub-round instruction and an even sub-round instruction may be used alternately.

As described above, the hardware module and its control method with a 32-bit instruction extension for processor supporting ARIA encryption and decryption according to the present disclosure as described above has the following effects.

First, it is possible to perform a high-speed encryption/decryption operation in applications using block cipher algorithm ARIA without degradation in performance of a processor.

Second, it is possible to perform a 128-bit operation, a basic operation unit of block cipher ARIA with a 32-bit unit operation instruction, and improve performance of a block cipher ARIA operation in a 32-bit microprocessor.

Third, it is possible to perform the entire ARIA encryption using the added 32-bit substitution layer and diffusion layer instructions and basic instructions of low-performance processors such as lightweight IoT devices.

Fourth, it is possible to have a structure suitable for use in a low-performance processor having a 32-bit system such as a 32-bit lightweight IoT device because a total of 8 diffusion layer instructions are also a 32-bit unit operation instruction.

Fifth, it is possible to reduce an area of an added crypto module since the entire encryption is performed through a combination of a software instruction and a hardware instruction while having a faster speed than an operation using only software.

BRIEF DESCRIPTION OF THE DRAWINGS

FIG. 8 is a configuration diagram illustrating an operation method of a fourth sub-round of the diffusion layer instruction.

DETAILED DESCRIPTION

Hereinafter, a preferred embodiment of a hardware module and its control method with a 32-bit instruction extension for processor supporting ARIA encryption and decryption according to the present disclosure will be described in detail as follows.

Features and advantages of the hardware module and its control method with a 32-bit instruction extension for processor supporting ARIA encryption and decryption according to the present disclosure will become apparent through detailed description of each embodiment below.

Figure 1:
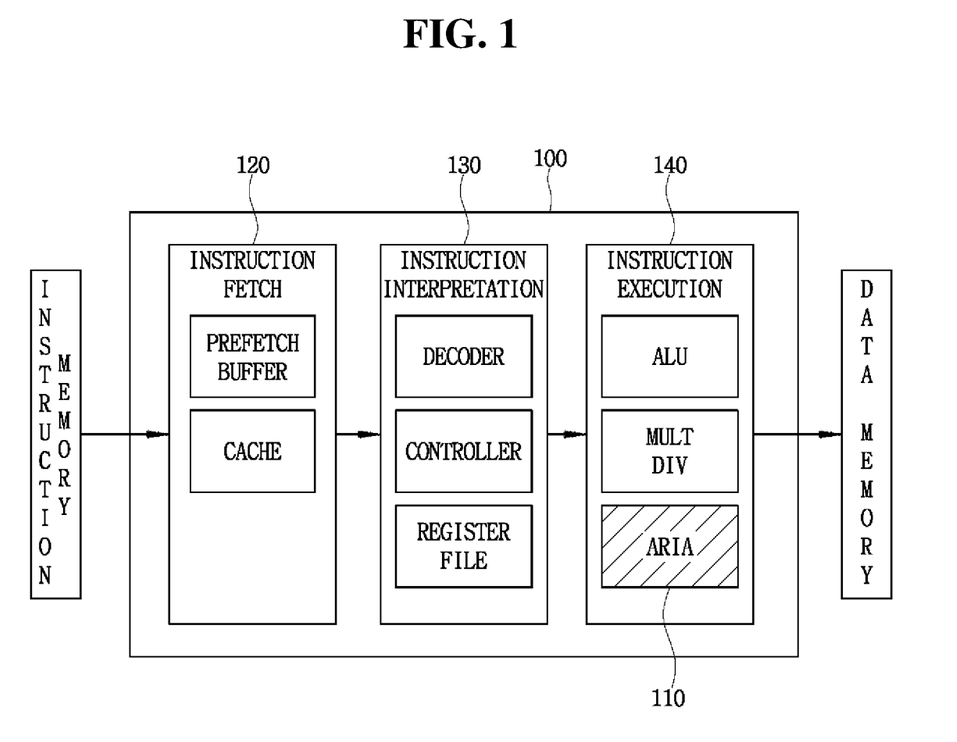
FIG. 1 is a configuration diagram of a hardware module with a 32-bit instruction extension for processor supporting ARIA encryption and decryption according to the present disclosure.

FIG. 1 is a configuration diagram of a hardware module with a 32-bit instruction extension for processor supporting ARIA encryption and decryption according to the present disclosure.

Unlike the existing structure that has utilized vector-based instruction extension for crypto acceleration, the hardware module and its control method with a 32-bit instruction extension for processor supporting ARIA encryption and decryption according to the present disclosure supports high-speed ARIA block cipher operation in a low-performance environment by presenting a high-speed model by combining hardware and software in a 32-bit system.

To implement this, the present disclosure implements four types of SBOX operation modules used for substitution layer operations in the case of substitution layer instructions, and to support different types of substitution layer operations used in odd rounds and even rounds. The substitution layer operation may include a configuration for implementing a 32-bit unit operation instruction through multiplexing.

According to the present disclosure, in the case of diffusion layer instruction, it is not necessary to distinguish between odd rounds and even rounds, but in order to separately perform one round of operations, the odd rounds and even rounds are divided into four sub-rounds. The present disclosure may include a configuration such that four instructions for odd sub-round and even sub-round operations are implemented, respectively.

As illustrated in FIG. 1, the configuration of the hardware module with a 32-bit instruction extension for processor supporting ARIA encryption and decryption according to the present disclosure includes an instruction pipeline 100 located between an instruction memory and a data memory, in which the instruction pipeline 100 executes instructions with instruction fetch 120, instruction decoding 130, and instruction execution 140, and includes an ARIA operation module 110 with a 32-bit instruction extension scheme for a processor that supports ARIA encryption and decryption.

In order to provide an ARIA encryption/decryption operation through the ARIA operation module 110, two kinds of instructions, ARIA substitution layer and diffusion layer instructions, are provided as 32-bit unit operation instructions, and the substitution layer instruction includes two instructions for an even round of ARIA encryption/decryption and an instruction for an odd round, and the diffusion layer includes four types of instructions for an even sub-round of the diffusion layer and four types of instructions for an odd sub-round.

The two types of substitution layer instructions are implemented using two types of sbox of the ARIA and an inverse thereof, and the two types of instructions may use same four sbox modules but different control methods, and as a result, have an efficient structure with no overlapping module implementations.

In addition, since the two types of instructions are supported as a 32-bit unit operation instruction, the instruction is used 4 times in one round to perform a 128-bit operation.

Eight types of diffusion layer instructions use swap method between partial matrices for an ARIA diffusion layer operation, and each sub-round uses a 32-bit unit operation instruction by four to perform a 128-bit operation.

The hardware module has a structure in which result value of an ARIA diffusion layer calculation is output after the sub-round is performed four times in a way that a current calculation result value is accumulated on a result value of a previous sub-round.

As described above, since a total of 8 diffusion layer instructions are also 32-bit unit operation instructions, the hardware module with a 32-bit instruction extension for processor supporting ARIA encryption and decryption according to the present disclosure has a structure suitable for use in a low-performance processor having a 32-bit system such as a 32-bit lightweight IoT device.

In particular, it is possible to reduce an area of an added crypto module since the entire encryption is performed through a combination of a software and a hardware while having a faster speed than the existing operation using only software.

Figure 2:
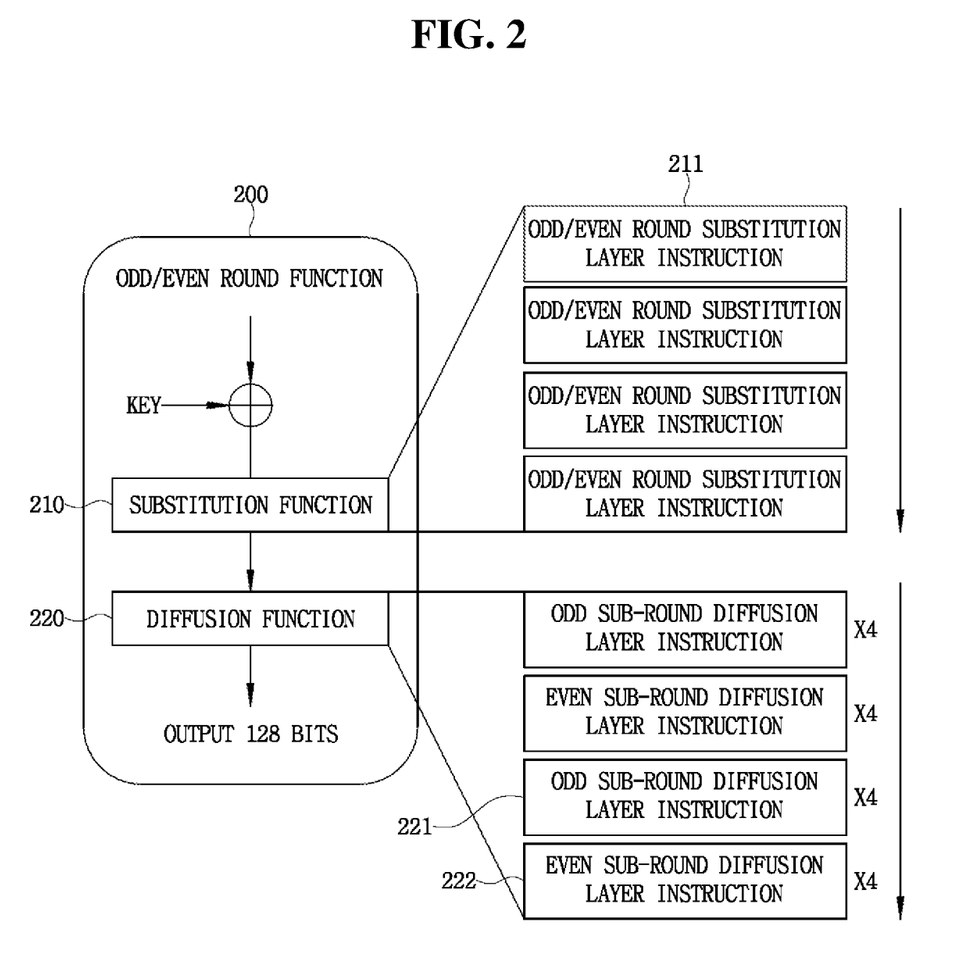
FIG. 2 is a flowchart of executing ARIA instruction extension used for an ARIA round function operation.

FIG. 2 is a flowchart of executing ARIA instruction extension used for an ARIA round function operation.

For ARIA substitution layer and diffusion layer instruction operations for a 32-bit unit operation, an execution of a round function 200 operation includes a step of executing a substitution layer function 210 performing a substitution layer instruction extension 211 operation on odd/even rounds of the ARIA, and a step of executing a diffusion layer function for the ARIA encryption/decryption performing an odd sub-round diffusion layer instruction extension 221 operation on a single round of the ARIA and an even sub-round diffusion layer instruction extension 222 operation on the single round of the ARIA.

As described above, an instruction set that supports ARIA high-speed encryption/decryption in a block cipher ARIA dedicated arithmetic unit operating in the instruction execution step of an instruction pipeline process of the processor is composed of a 32-bit substitution layer instruction and a 32-bit diffusion layer instruction.

The substitution layer instruction is composed of two sub-instructions for an odd round and an even round, and the diffusion layer instruction is composed of eight sub-instructions for the odd sub-round and the even sub-round.

Figure 3:
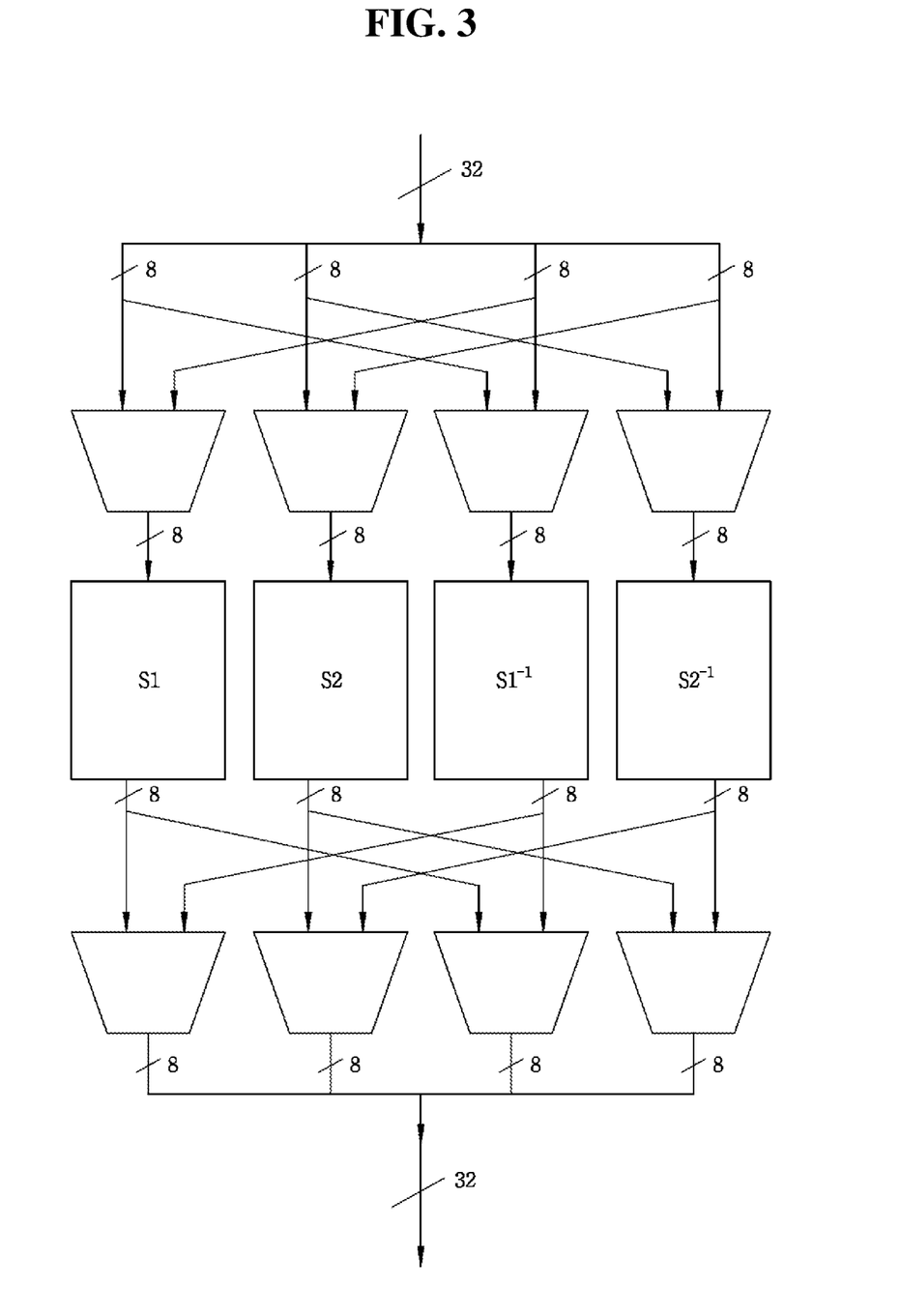
FIG. 3 is a structural diagram of a module supporting two types of 32-bit substitution layer instructions.
Figure 4:
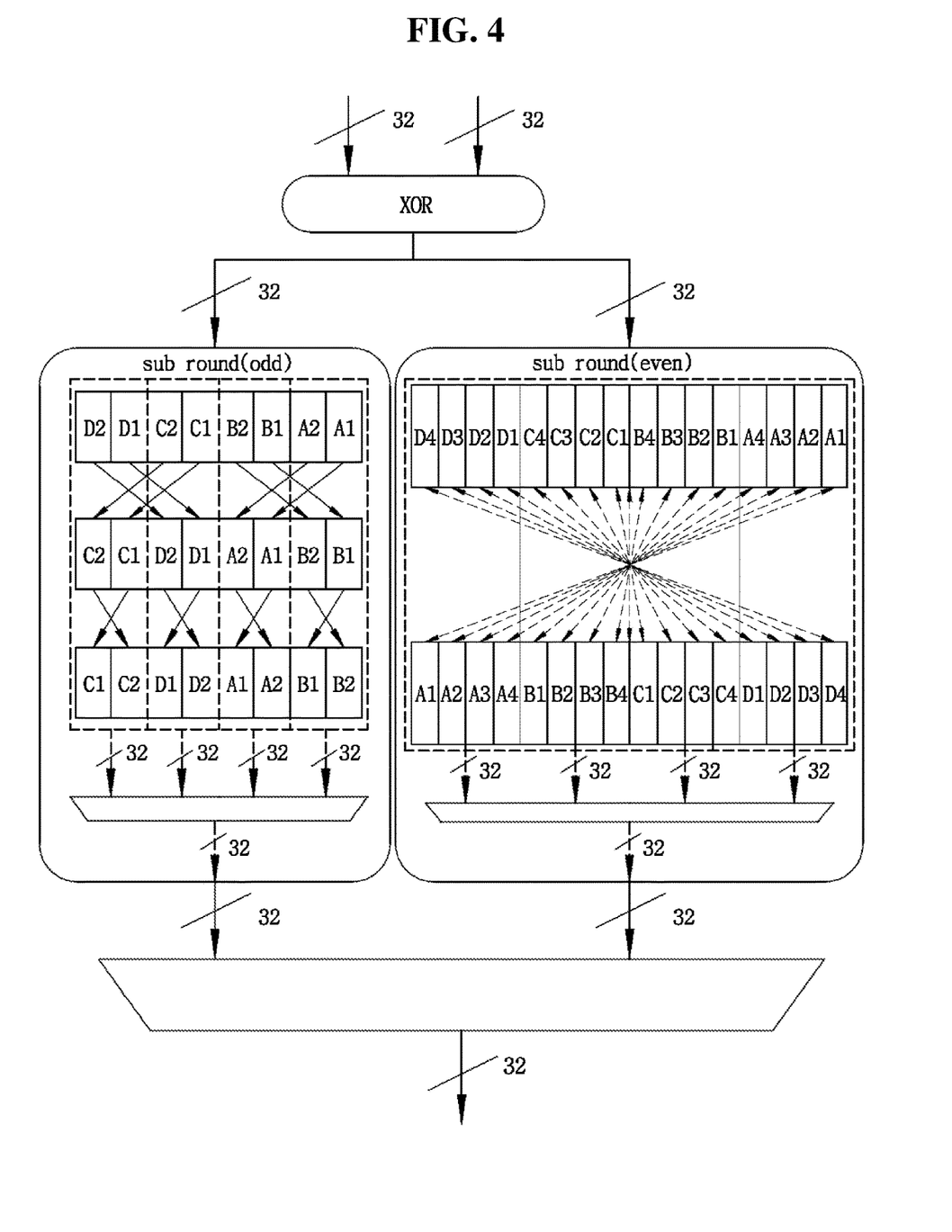
FIG. 4 is a structural diagram of a module supporting a 32-bit odd sub-round instruction and a 32-bit even sub-round instruction of a diffusion layer.

FIG. 3 is a structural diagram of a module supporting two types of 32-bit substitution layer instructions, and FIG. 4 is a structural diagram of a module supporting a 32-bit odd sub-round instruction and a 32-bit even sub-round instruction of a diffusion layer.

The present disclosure implements four types of SBOX operation modules used for substitution layer operations in the case of substitution layer instructions, and to support different types of substitution layer operations used in odd rounds and even rounds. The substitution layer operation may include a configuration for implementing a 32-bit unit operation instruction through multiplexing.

To support the substitution layer instruction, the implementation of SBOX consists of four SBOXs, including two SBOXs S1 and S2 and an inverse thereof, and each SBOX is implemented in hardware as a single module, and when used in two substitution layer instructions, operates in such a way that an input and an output of the module are changed via internal control signals.

According to the present disclosure, in the case of diffusion layer instruction, it is not necessary to distinguish between odd rounds and even rounds, but in order to separately perform one round of operations, the odd rounds and even rounds are divided into four sub-rounds. The present disclosure may include a configuration such that four instructions for odd sub-round and even sub-round operations are implemented, respectively.

Figure 5:
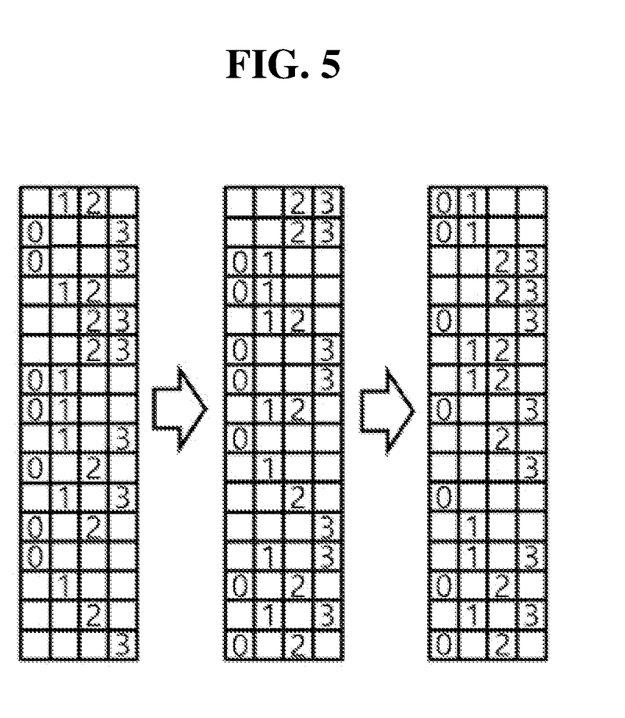
FIG. 5 is a configuration diagram illustrating an operation method of a first sub-round of a diffusion layer instruction.
Figure 6:
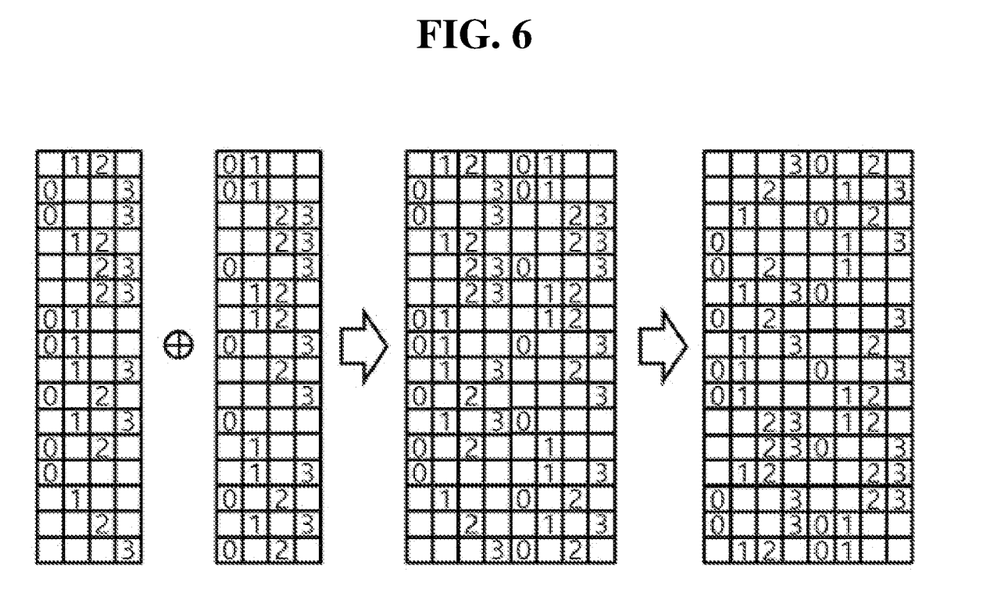
FIG. 6 is a configuration diagram illustrating an operation method of a second sub-round of the diffusion layer instruction.

FIG. 5 is a configuration diagram illustrating an operation method of a first sub-round of a diffusion layer instruction, and FIG. 6 is a configuration diagram illustrating an operation method of a second sub-round of the diffusion layer instruction.

Figure 7:
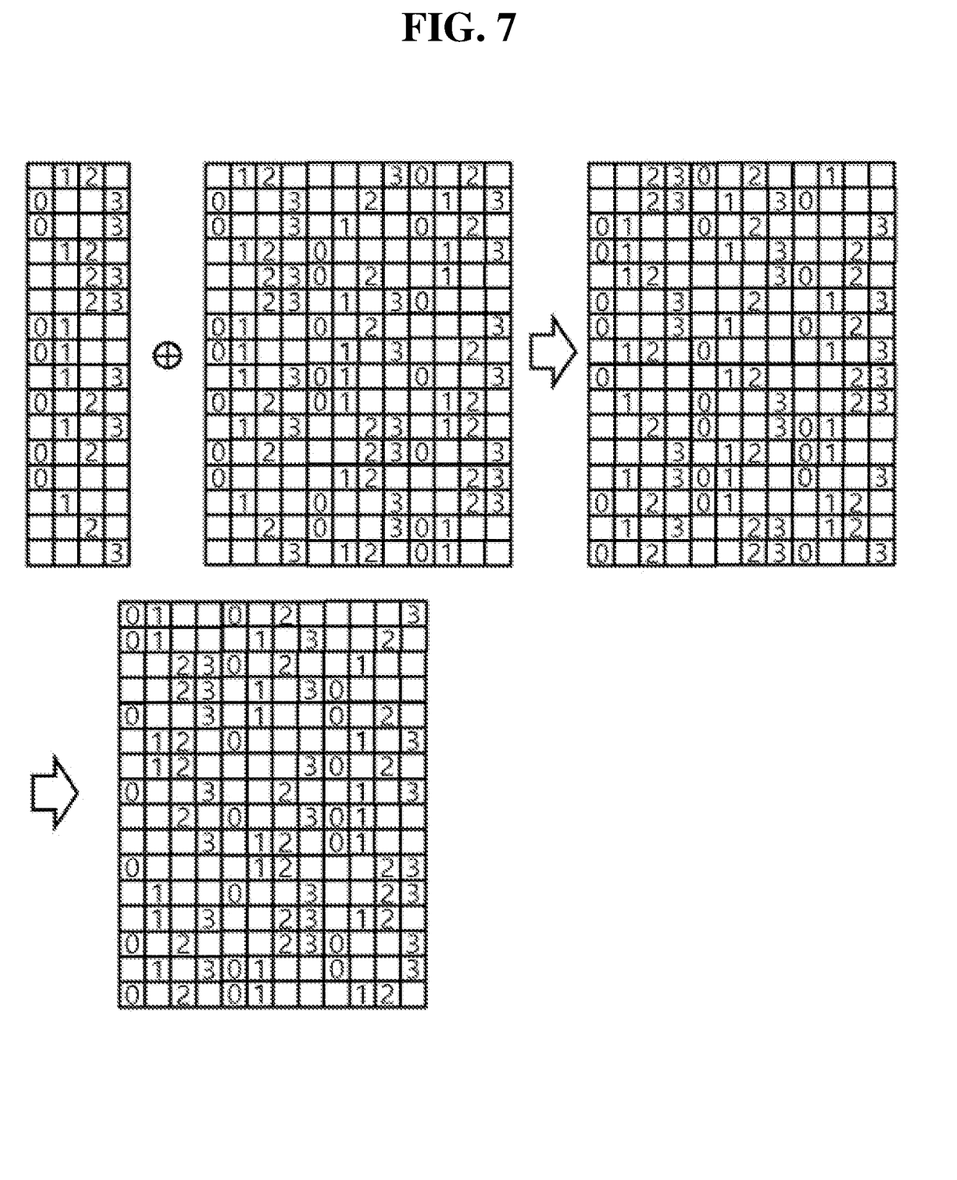
FIG. 7 is a configuration diagram illustrating an operation method of a third sub-round of the diffusion layer instruction.

FIG. 7 is a configuration diagram illustrating an operation method of a third sub-round of the diffusion layer instruction, and FIG. 8 is a configuration diagram illustrating an operation method of a fourth sub-round of the diffusion layer instruction.

Since a diffusion layer instruction has one instruction for each 4*4 matrix operation in the odd sub-round, a total of four instructions are used, and since the diffusion layer instruction has one instruction for each 4*4 matrix operation in the even sub-round, a total of four instructions are used.

For one round operation, an odd sub-round instruction and an even sub-round instruction need to be used alternately.

Unlike the existing structure that has utilized the vector-based instruction extension for crypto acceleration, the present disclosure supports a high-speed ARIA block cipher operation in a lighter environment by presenting a high-speed model by a combination of hardware and software in a 32-bit operating system.

The hardware module and its control method with a 32-bit instruction extension for processor supporting ARIA encryption and decryption according to the present disclosure described above is to improve the performance of the block cipher ARIA operation in a 32-bit microprocessor.

The present disclosure makes it possible to perform 128-bit operation, the basic operation unit of the block cipher of the ARIA, with 32-bit unit operation instructions, and thus, has a structure suitable for use in low-performance processors with 32-bit systems such as 32-bit lightweight IoT devices.

As described above, it will be understood that the present disclosure is implemented in a modified form within a range that does not deviate from the essential characteristics of the present disclosure.

Therefore, the specified embodiments should be considered in an illustrative rather than a restrictive view, the scope of the present disclosure is indicated in the claims rather than in the foregoing description, and all differences within the scope equivalent thereto should be construed as being included in the present disclosure.

What is claimed is:

1. A hardware module with a 32-bit unit operation for processor supporting ARIA encryption and decryption, comprising:

an instruction pipeline that executes an instruction fetch, instruction decoding, and an instruction execution; and an ARIA operation module that has a 32-bit unit operation system provided in the instruction execution pipeline to support ARIA encryption and decryption, wherein two types of instructions, ARIA substitution layer instruction and ARIA diffusion layer instruction are executed as 32-bit unit operation instructions in order to perform an ARIA encryption/decryption function through the ARIA operation module, and the ARIA substitution layer instruction includes two instructions for an even round and an odd round of the ARIA encryption/decryption function, and the ARIA diffusion layer instruction includes four types of diffusion layer instructions for an even sub-round and four types of diffusion layer instructions for an odd sub-round.

2. The hardware module of claim 1, wherein two types of substitution layer instructions are implemented using two types of sbox of the ARIA and an inverse thereof, and two types of instructions use same four sbox modules but different control methods.

3. The hardware module of claim 1, wherein the two types of instructions are supported as a 32-bit unit operation instruction and are used 4 times in one round to perform a 128-bit operation.

4. The hardware module of claim 1, wherein eight types of diffusion layer instructions use swap method between partial matrices for an ARIA diffusion layer operation, and each sub-round uses a 32-bit unit operation instruction by four to perform a 128-bit operation, and the hardware module has a structure in which result value of an ARIA diffusion layer calculation is output after the sub-round is performed four times in a way that a current calculation result value is accumulated on a result value of a previous sub-round.

5. A control method of hardware module with a 32-bit instruction extension for processor supporting ARIA encryption and decryption, the method comprising:

executing ARIA substitution layer instruction and ARIA diffusion layer instruction for 32-bit unit operations, wherein the ARIA substitution layer instruction includes a round function for ARIA encryption/decryption operation that includes a substitution layer execution step of performing a substitution layer operation for odd/even rounds ARIA, and the ARIA diffusion layer instruction includes a diffusion layer execution step of performing an odd sub-round diffusion layer operation for a single round of ARIA and an even sub-round diffusion layer operation for a single round of ARIA, wherein the ARIA substitution layer instruction is composed of two sub-instructions for an odd round and an even round, and the ARIA diffusion layer instruction is composed of eight sub-instructions for the odd sub-round and the even sub-round.

6. The control method of claim 5, wherein an extended instruction set for operating a block cipher ARIA dedicated arithmetic unit operating in an instruction execution step during an instruction pipeline process of the processor is composed of a 32-bit substitution layer instruction and a 32-bit diffusion layer instruction.

7. The control method of claim 6, wherein in a case of the ARIA substitution layer instruction, four types of SBOX operation modules used for the substitution layer operation are implemented, and a 32-bit unit operation instruction is implemented with multiplexing to support different types of substitution layer operations used in the odd round and the even round.

8. The control method of claim 7, wherein to support the ARIA substitution layer instruction, the implementation of SBOX consists of four SBOXs, including two SBOXs S1 and S2 and an inverse thereof, and when used in two substitution layer instructions, operates in such a way that an input and an output of the module are changed via internal control signals.

9. The control method of claim 6, wherein a diffusion layer instruction has one instruction for each 4*4 matrix operation in the odd sub-round, a total of four instructions are used for the odd sub-round, the diffusion layer instruction has one instruction for each 4*4 matrix operation in the even sub-round, and a total of four instructions are used for the even sub-round.

10. The control method of claim 6, wherein for one round operation, an odd sub-round instruction and an even sub-round instruction are used alternately.

* * * * *